(12) United States Patent
Chun et al.

(10) Patent No.: US 12,165,611 B2
(45) Date of Patent: Dec. 10, 2024

(54) DISPLAY DEVICE AND METHOD OF DRIVING THE SAME

(71) Applicant: SAMSUNG DISPLAY CO., LTD., Yongin-si (KR)

(72) Inventors: Byung Ki Chun, Seoul (KR); Hyeonmin Kim, Gwacheon-si (KR); Youngwook Yoo, Suwon-si (KR); Jungyu Lee, Seoul (KR); Hyunjun Lim, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/333,678

(22) Filed: May 28, 2021

(65) Prior Publication Data

US 2022/0028355 A1 Jan. 27, 2022

(30) Foreign Application Priority Data

Jul. 21, 2020 (KR) .................. 10-2020-0090299

(51) Int. Cl.
*G09G 5/10* (2006.01)
*G09G 3/32* (2016.01)

(52) U.S. Cl.
CPC ............. *G09G 5/10* (2013.01); *G09G 3/32* (2013.01); *G09G 2320/0686* (2013.01)

(58) Field of Classification Search
None
See application file for complete search history.

(56) References Cited

U.S. PATENT DOCUMENTS

| 10,748,317 B2 | 8/2020 | Park | |
| 2012/0213429 A1* | 8/2012 | Vasudevan | G06V 30/422 382/176 |
| 2014/0146071 A1* | 5/2014 | Kim | G09G 3/3225 345/589 |

(Continued)

FOREIGN PATENT DOCUMENTS

| KR | 10-2014-0070792 A | 6/2014 |
| KR | 10-2017-0003213 | 1/2017 |

(Continued)

*Primary Examiner* — Andre L Matthews
(74) *Attorney, Agent, or Firm* — F. CHAU & ASSOCIATES, LLC

(57) ABSTRACT

The present disclosure provides a display device with a display panel and driver. The driver includes a logo compensator to generate a logo map data with respect to a logo area through which the logo image is displayed and compensates for a brightness of the logo area using the logo map data. The logo compensator includes an extractor, a logo calculator, a logo determination unit, and a brightness compensation block. The extractor extracts logo area data. The logo calculator calculates the logo map data with first data corresponding to a first image recognized as the logo image and second data corresponding to a second image recognized as a logo background image. The logo determination unit sets a boundary area and determining whether a first area corresponding to the first image overlaps the boundary area to output determination data. The brightness compensation block compensates for the brightness of the logo area.

18 Claims, 11 Drawing Sheets

(56) References Cited

U.S. PATENT DOCUMENTS

| | | | |
|---|---|---|---|
| 2014/0270504 A1* | 9/2014 | Baum | G06V 20/635 |
| | | | 382/165 |
| 2020/0020303 A1* | 1/2020 | Kim | G09G 5/10 |
| 2020/0074596 A1 | 3/2020 | Chun et al. | |
| 2021/0103765 A1 | 4/2021 | Chun et al. | |

FOREIGN PATENT DOCUMENTS

| | | |
|---|---|---|
| KR | 10-2017-0037783 | 4/2017 |
| KR | 10-2020-0026421 | 3/2020 |
| KR | 10-2020-0027617 A | 3/2020 |
| KR | 10-2021-0041687 | 4/2021 |

\* cited by examiner

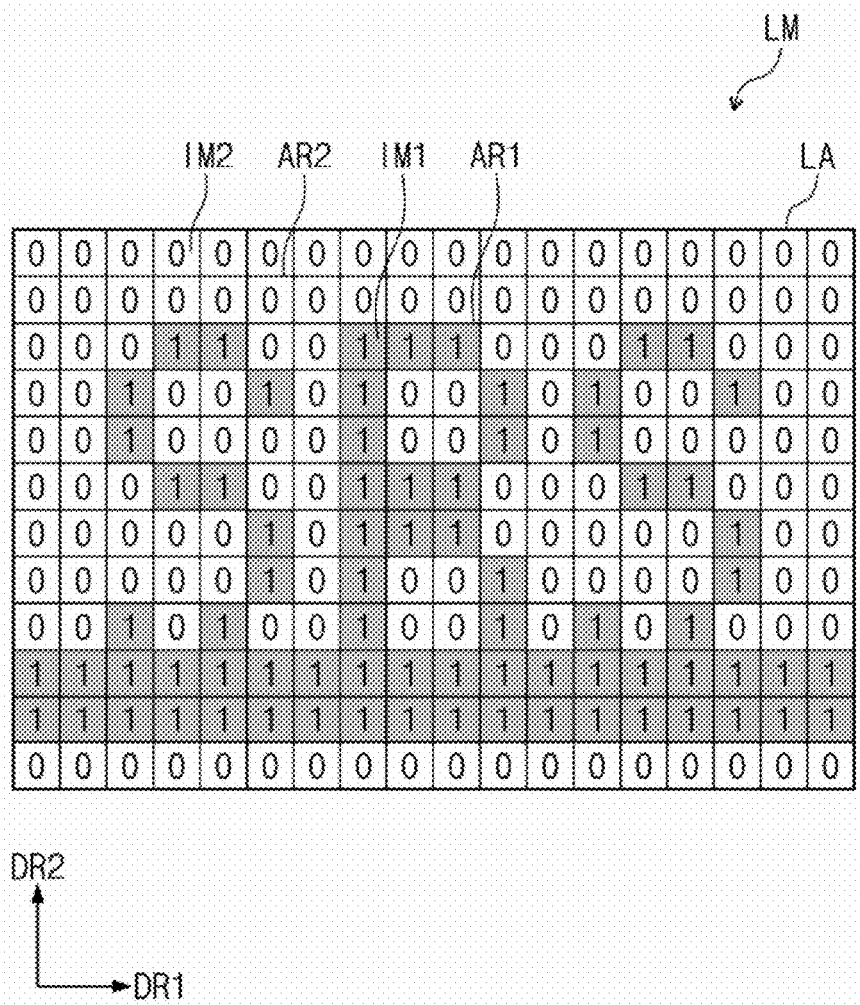

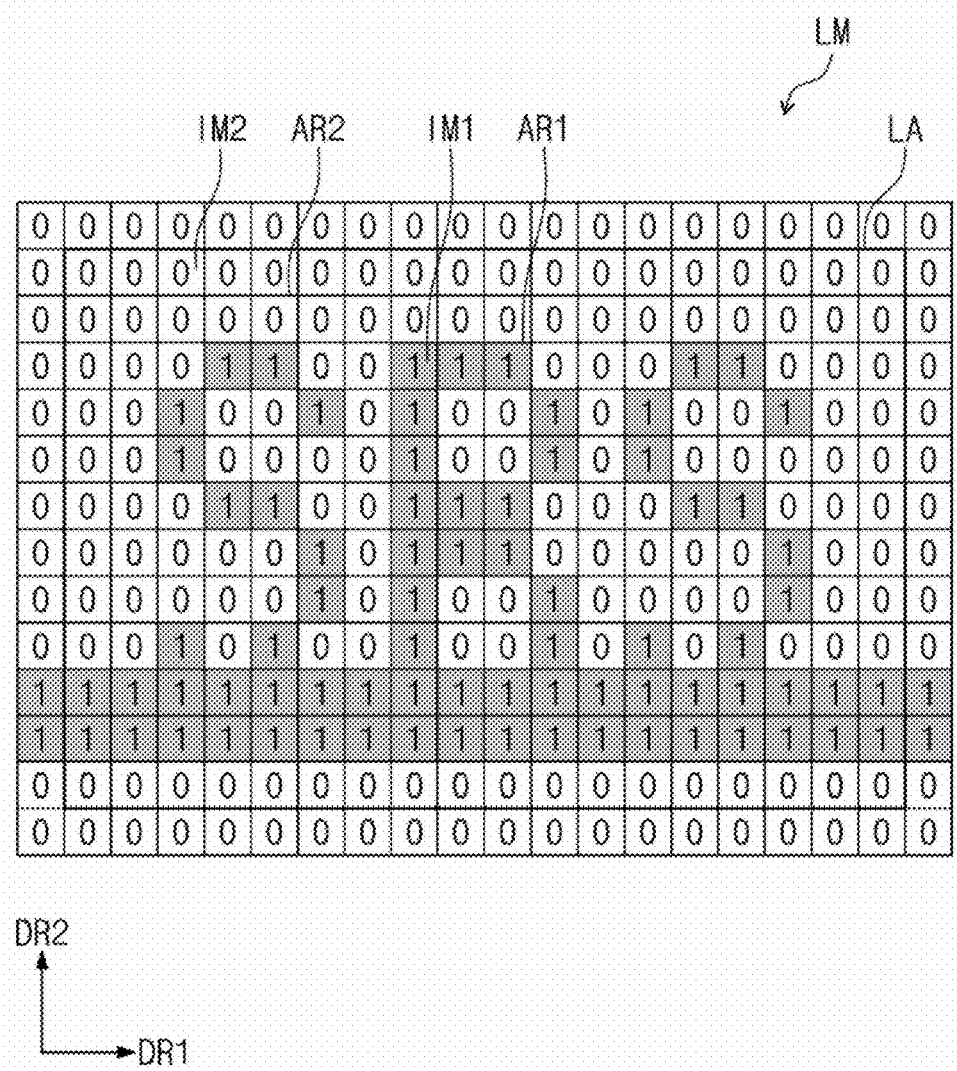

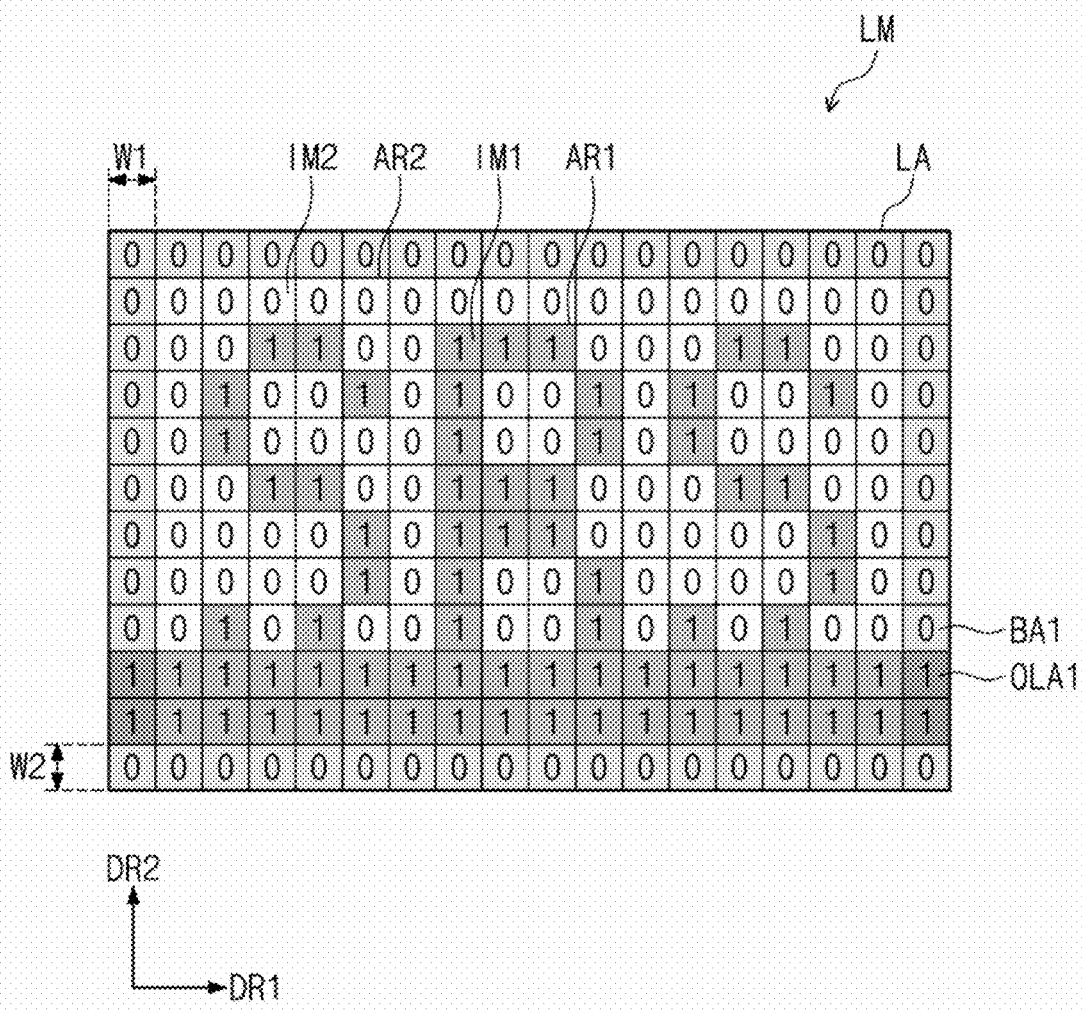

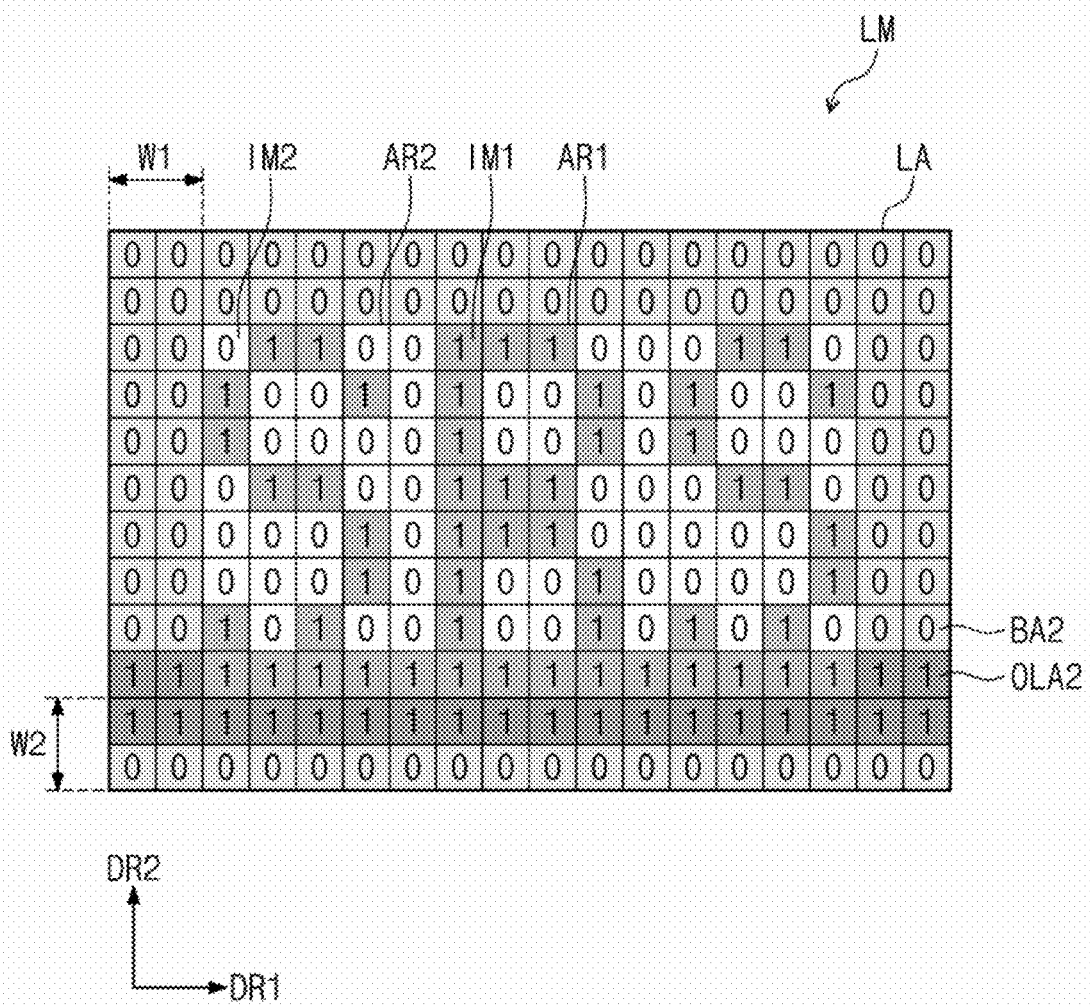

DISPLAY DEVICE AND METHOD OF DRIVING THE SAME

CROSS-REFERENCE TO RELATED APPLICATION

This U.S. non-provisional patent application claims priority under 35 U.S.C. § 119 of Korean Patent Application No. 10-2020-0090299, filed on Jul. 21, 2020, the contents of which are incorporated by reference herein in their entirety.

BACKGROUND

1. Field of Disclosure

The present disclosure relates to a display device and a method of driving the same. More particularly, the present disclosure relates to a display device displaying an image with a logo and a method of driving the display device.

2. Description of the Related Art

A display device is an apparatus that can display information to a user, through images, videos, or text. A television set, a monitor, a mobile phone, a tablet computer, a car navigation unit, or a game unit are considered display devices. An organic light-emitting display panel, a liquid crystal display panel, or a plasma display panel may be used in the display device to show the information to the user.

Display panels include pixels that emit light. The devices apply a current and a voltage to the pixels to display the images. Each pixel corresponds to a particular color and light intensity, and together they form the display panel.

When the same image is displayed on the device for an extended period of time, the pixels may deteriorate, resulting in image retention or burn-in that reduces image quality image quality. For example, in the case of a television display panel, the display panel may often display a specific image, such as a logo for a television channel, in a corner of the screen. Extended display of the logo may damage the pixels, causing the logo to be permanently visible on the television. Therefore, there is a need in the art for a system and method to prevent the deterioration of pixels in a display panel.

SUMMARY

The present disclosure provides a display device capable of preventing deterioration in image quality due to a difference in brightness between a logo image and a background image around the logo image. The present disclosure also provides a method of driving the display device.

Embodiments of the inventive concept provide a display device including a display panel comprising a display area configured to display an image comprising a logo image and a non-logo image; and a driver configured to receive an image signal and apply a data signal to the display panel, the driver comprising a logo compensator configured to generate logo map data for a logo area configured to display the logo image and to compensate for a brightness of the logo area based on the logo map data, the logo compensator comprising: an extractor configured to extract logo area data with respect to the logo area from the image signal; a logo calculator configured to calculate the logo map data comprising first data corresponding to a first image recognized as the logo image and second data corresponding to a second image recognized as a logo background image around the logo image; a logo determination unit configured to set a portion of the logo area as a boundary area, to determine whether a first area corresponding to the first image in the logo area overlaps the boundary area, and to output determination data; and a brightness compensation block configured to compensate for the brightness of the logo area based on the determination data.

In some embodiments, the logo determination unit includes a boundary setting unit setting the boundary area, a calculator calculating an overlap value that indicates a degree of overlap between the boundary area and the first area, and an error determination unit comparing the overlap value with a predetermined threshold value, generating first determination data when the overlap value is greater than the threshold value, and generating second determination data when the overlap value is equal to or smaller than the threshold value.

In some embodiments, the display panel includes a plurality of pixels, the calculator includes a counter counting a number of pixels corresponding to an area in which the boundary area overlaps the first area, and the calculator outputs the counted value as the overlap value.

In some embodiments, the boundary area is set around an edge in the logo area. In some embodiments, the boundary area does not overlap the area through which the logo image is displayed in the logo area. In some embodiments, the brightness compensation block further includes a compensation determination unit that receives the determination data from the error determination unit and determines whether to compensate for the brightness of the logo area.

In some embodiments, the brightness compensation block further includes a brightness compensator that receives the image signal and compensates for the image signal based on the logo map data and compensation data used to compensate for a brightness corresponding to the first area of the logo area to a predetermined target brightness.

In some embodiments, the compensation determination unit applies the logo map data and the compensation data to the brightness compensator when receiving the second determination data. In some embodiments, the compensation determination unit does not apply at least one of the logo map data and the compensation data to the brightness compensator when receiving the first determination data.

In some embodiments, the driver includes a timing controller receiving the image signal and a control signal from the external and generating image data, a source control signal and a gate control signal, a source driver receiving the image data and the source control signal from the timing controller, and a gate driver receiving the gate control signal from the timing controller, and the timing controller includes the logo compensator. In some embodiments, the logo calculator calculates the logo map data including the first and second data with respect to an area wider than the logo area based on the logo area data.

Embodiments of the inventive concept provide a method of driving a display device including a display panel including a display area through which an image including a logo image and a non-logo image is displayed and a driver receiving an image signal from an outside and applying a data signal to the display panel. The driving method of the display device includes generating logo map data with respect to a logo area through which the logo image is displayed in the display area and compensating for a brightness of the logo area using the logo map data. The compensating for the brightness of the logo area includes extracting logo area data with respect to the logo area from the image signal, calculating the logo map data including first data corresponding to a first image recognized as the logo image and second data corresponding to a second image recognized as a logo background image around the logo image based on the logo area data, setting a portion of the logo area as a boundary area and determining whether a first area corresponding to the first image in the logo area overlaps the boundary area to output determination data, and compensating for the brightness of the logo area according to the determination data.

In some embodiments, the outputting of the determination data includes setting the boundary area, calculating an overlap value that indicates a degree of overlap between the boundary area and the first area, and comparing the overlap value with a predetermined threshold value to generate first determination data when the overlap value is greater than the threshold value and to generate second determination data when the overlap value is equal to or smaller than the threshold value.

In some embodiments, the display panel includes a plurality of pixels, and the calculating of the overlap value includes counting a number of boundary pixels corresponding to the boundary area and overlapping first pixels corresponding to the first area and outputting the counted value as the overlap value.

In some embodiments, the boundary area is set around an edge in the logo area. In some embodiments, the boundary area does not overlap an area through which the logo image is displayed in the logo area.

In some embodiments, the compensating for the brightness of the logo area further includes determining whether to compensate for the brightness of the logo area based on the determination data. In some embodiments, the compensating for the brightness of the logo area further includes receiving the image signal and compensating for the image signal based on the logo map data and compensation data used to compensate for a brightness corresponding to the first area of the logo area to a predetermined target brightness.

When the second determination data are received in the determining whether to compensate for the brightness of the logo area, the logo map data and the compensation data may be outputted. When the first determination data are received in the determining whether to compensate for the brightness of the logo area, at least one of the logo map data and the compensation data is not outputted.

According to the above, it is possible to check whether there is an error in calculating the logo map data that include data corresponding to the image recognized as the logo image and the image recognized as the logo background image around the logo image. Therefore, when it is determined that there is no error in calculating the logo map data, the brightness of the area corresponding to the area recognized as the log image is not compensated. Accordingly, the area that does not correspond to the logo image is prevented from being recognized as the logo image, and the brightness compensation operation is not performed on the area through which the logo background image is displayed. As a result, deterioration of the image quality displayed on the display panel may be prevented.

BRIEF DESCRIPTION OF THE DRAWINGS

The above and other advantages of the present disclosure will become readily apparent by reference to the following detailed description when considered in conjunction with the accompanying drawings wherein:

FIGS. 5A and 5B are views showing an operation of a logo calculator of FIG. 3;

FIGS. 7A and 7B are views showing an operation of a boundary setting unit and a counter of FIG. 6;

DETAILED DESCRIPTION

Figure 1:
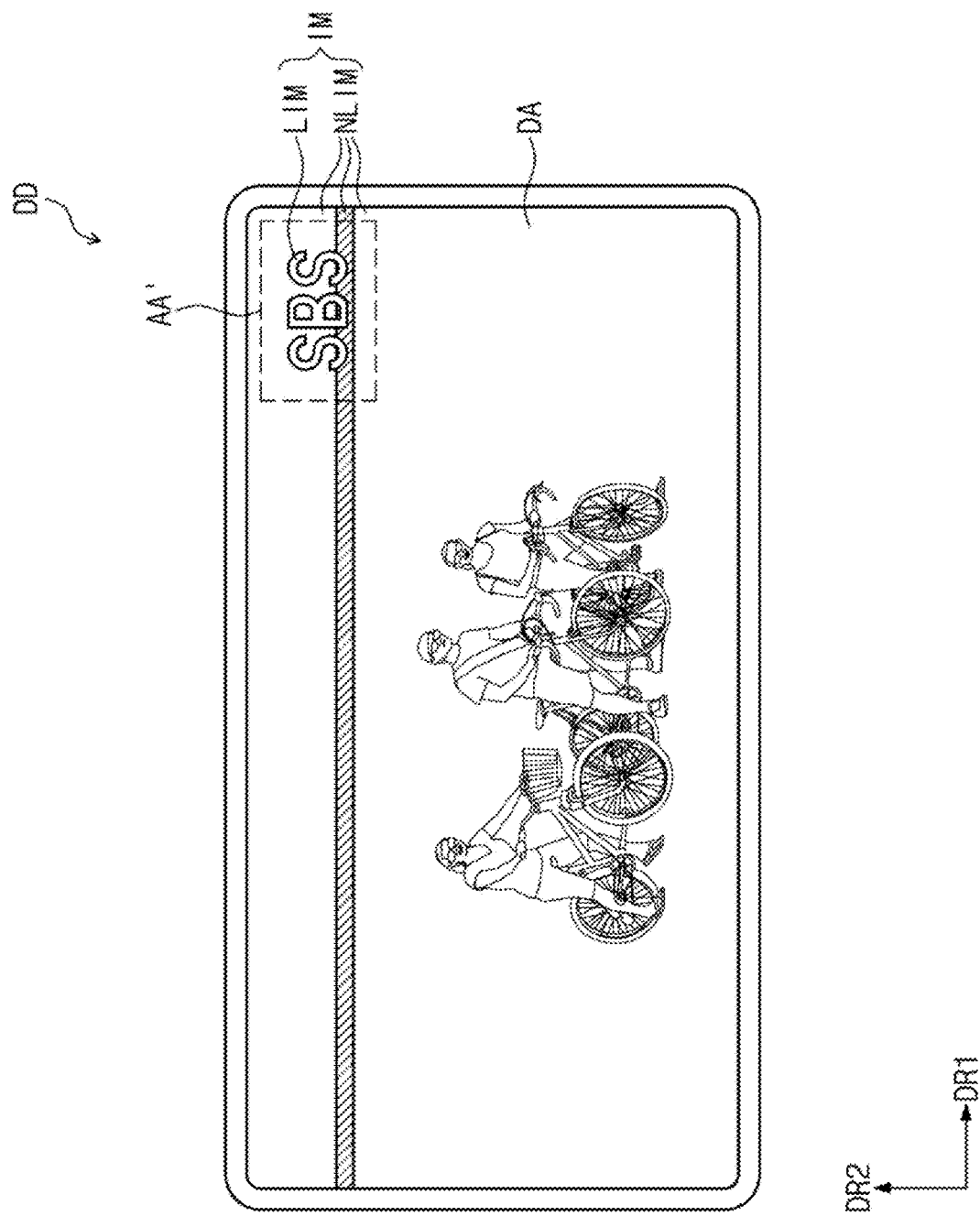
FIG. 1 is a plan view showing a display device according to an embodiment of the present disclosure.

The present disclosure relates generally a display device and a method of driving the display device. More particularly, the present disclosure relates to a display device displaying an image with a logo and a method to maintain image quality and reduce the likelihood of a burn-in scenario of the display. The present disclosure may prevent deterioration in image quality due to a difference in brightness between a logo image and a background image around the logo image.

In some embodiments, the system of the present disclosure recognizes and extracts logo data from a screen and checks whether there is an error in calculating the logo data. The system may then compensate for the brightness of the logo data to prevent a burn-in scenario.

The present disclosure provides a display panel and a driver. The driver includes a logo compensator to generate a logo map data with respect to a logo area through which the logo image is displayed and compensates for a brightness of the logo area using the logo map data. The logo compensator includes an extractor, a logo calculator, a logo determination unit, and a brightness compensation block. The extractor extracts logo area data. The logo calculator calculates the logo map data with first data corresponding to a first image recognized as the logo image and second data corresponding to a second image recognized as a logo background image. The logo determination unit sets a boundary area and determining whether a first area corresponding to the first image overlaps the boundary area to output determination data. The brightness compensation block compensates for the brightness of the logo area.

In the present disclosure, it will be understood that when an element or layer is referred to as being "on", "connected to" or "coupled to" another element or layer, the element or layer can be directly on, connected or coupled to the other element or layer or intervening elements or layers may be present.

Like numerals refer to like elements throughout. In the drawings, the thickness, ratio, and dimension of components are exaggerated for an effective description of the technical content.

As used herein, the term "and/or" includes any and all combinations of one or more of the associated listed items.

It will be understood that, although the terms first, second, etc., may be used herein to describe various elements, components, regions, layers and/or sections, these elements, components, regions, layers and/or sections should not be limited by these terms. These terms are only used to distinguish one element, component, region, layer or section from another region, layer, or section. Therefore, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element s or feature s as illustrated in the figures.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted with a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the present disclosure will be explained in detail with reference to the accompanying drawings.

Figure 2:
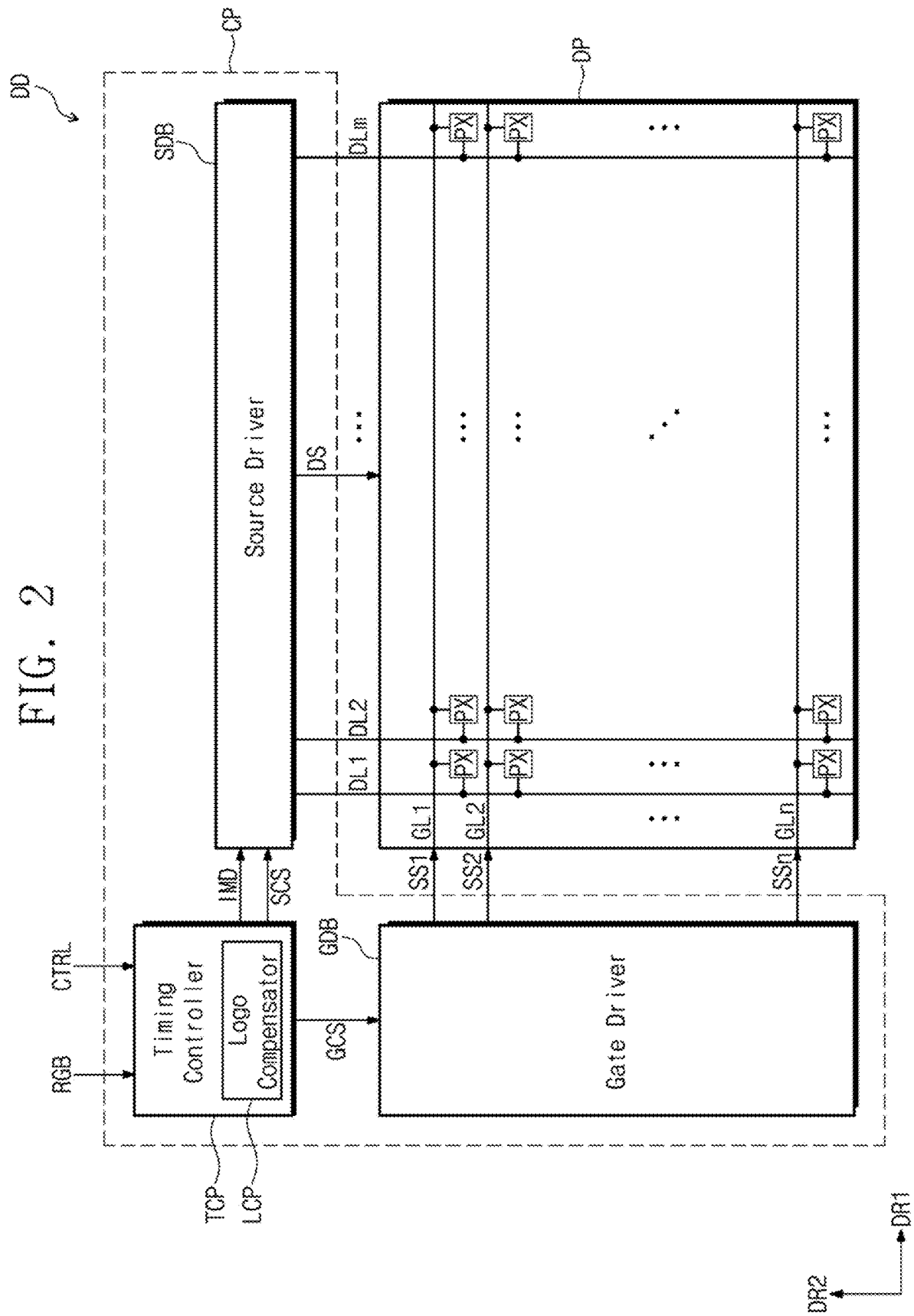
FIG. 2 is a block diagram showing a display device according to an embodiment of the present disclosure.

FIGS. 1 and 2 are plan views showing a display device DD according to an embodiment of the present disclosure.

Referring to FIGS. 1 and 2, the display device DD may have a rectangular shape with long sides extending in a first direction DR1 and short sides extending in a second direction DR2 crossing the first direction DR1. In this case, the second direction DR2 may be substantially perpendicular to the first direction DR1. However, the shape of the display device DD should not be limited thereto or thereby, and the display device DD may have a variety of shapes.

The display device DD may be a large-sized display device, such as a television set, a monitor, or the like, or a small- and medium-sized display device, such as a mobile phone, a tablet computer, a car navigation unit, a game unit, or the like. However, these are examples, and the display device DD may be employed in other electronic items as long as the items do not depart from the inventive concept of the present disclosure.

Referring to FIGS. 1 and 2, the display device DD may include a display panel DP displaying an image IM and a driver CP driving the display panel DP. For example, the driver CP may include a timing controller TCP, a gate driver GDB, and a source driver SDB.

The display panel DP may include a display area DA displaying the image IM and a non-display area NDA defined around the display area DA. The display area DA may be an area through which the image is displayed, and the non-display area NDA may be a bezel area through which no image is displayed. FIG. 1 shows a structure in which the non-display area NDA is defined to surround the display area DA. However, the present disclosure should not be limited thereto or thereby. The non-display area NDA may be adjacent to one side of the display area DA.

The image IM may be displayed through the display area DA. The image IM may include a logo image LIM and a non-logo image NLIM. As used herein, the term "logo" or "logo image" may refer to a portion of the image IM that is displayed for an extended period in a same portion of the display area DA, while other portions of the image IM are changed.

In some cases, the logo image LIM may be an image displayed at a fixed position for a predetermined time at a specific gray level. The logo image may be a still image, and the non-logo image may be a moving image or a still image. For example, the logo image LIM may include a broadcaster logo, subtitles, date, time, and the like. The logo image LIM may include a title of a program. Hereinafter, for the convenience of explanation, all various images displayed at a fixed position for a predetermined time or longer in a specific gray level will be referred to as the logo image LIM. The non-logo image NLIM may be an image displayed through the other area of the display area DA except an area through which the logo image LIM is displayed.

The timing controller TCP may receive image signal RGB and a control signal CTRL from, for example, an external source. The timing controller TCP may convert a data format of the image signal RGB to a format appropriate to an interface between the timing controller TCP and the source driver SDB to generate image data IMD. The timing controller TCP may convert the control signal CTRL to generate a gate control signal GCS and a source control signal SCS. The timing controller TCP may output the image data IMD, the source control signal SCS, and the gate control signal GCS. The timing controller TCP may include a logo compensator LCP. The logo compensator LCP may detect the logo image LIM based on the image signal RGB. The logo compensator LCP may compensate for the brightness of the logo image LIM to prevent burn-in and image retention of the pixel PX, which are caused by the logo image displayed through the same pixel PX for an extended period of time. According to the embodiment of the present disclosure, the logo compensator LCP may reduce the brightness of the logo image LIM.

The source driver SDB may receive the source control signal SCS and the image data IMD from the timing controller TCP. The source driver SDB may convert the image data IMD to data signals DS in response to the source control signal SCS and may output the data signals DS to a plurality of data lines DL1 to DLm described below. The data signals DS may be analog voltages corresponding to grayscale values of the image data IMD.

The gate driver GDB may receive the gate control signal GCS from the timing controller TCP. The gate driver GDB may generate scan signals SS1 to SSn in response to the gate control signal GCS and may output the scan signals SS1~SSn to a plurality of gate lines GL1-GLn described below.

The display panel DP may include the gate lines GL1 to GLn, the data lines DL1 to DLm, and a plurality of pixels PX. The gate lines GL1 to GLn may extend in the first direction DR1 and may be arranged in the second direction DR2 crossing the first direction DR1 to be substantially parallel to each other. The data lines DL1 to DLm may be arranged in the first direction DR1 to be substantially parallel and may extend in the second direction DR2.

The pixels PX may be arranged in the display area DA along the first and second directions DR1 and DR2. For example, the pixels PX may be arranged in a matrix form. Each of the pixels PX may be electrically connected to one of the gate lines GL1 to GLn and one of the data lines DL1 to DLm. Each pixel may be turned on in response to a corresponding scan signal among the scan signals SS1 to SSn, which is applied thereto through a corresponding gate line among the gate lines and may receive a corresponding data voltage among the data voltages DS through a corresponding data line among the data lines. Therefore, the image with a desired grayscale may be displayed.

The gate driver GDB may sequentially output the scan signals SS1 to SSn to the gate lines GL1 to GLn. Accordingly, the pixels PX may be sequentially scanned in the unit of row by the scan signals SS1 to SSn. For example, the gate driver GDB may include a shift register that sequentially outputs the scan signals SS1 to SSn. FIG. 2 shows a structure in which one gate driver GDB is electrically connected to the gate lines GL1 to GLn. However, the present disclosure should not be limited thereto or thereby. For example, the gate driver GDB may include a first gate driver and a second gate driver. The first gate driver may be electrically connected to one ends of the gate lines GL1 to GLn, and the second gate driver may be electrically connected to the other ends of the gate lines GL1 to GLn. The first and second gate drivers may be substantially simultaneously turned on and may substantially simultaneously output the scan signals SS1 to SSn to the same gate line. Accordingly, the gate lines GL1 to GLn may receive the scan signals SS1 to SSn from the first and second gate drivers through opposite ends thereof.

The gate driver GDC may be built in the display panel DP. For example, the gate driver GDC may be formed in the non-display area NDA of the display panel DP through a thin film process performed to form the pixels PX in the display area DA of the display panel DP.

The source driver SDB may convert the image data IMD to the data voltages and may apply the data voltages to the data lines DL1 to DLm of the display panel DP. The source driver SDB may include a plurality of driving chips. Each of the driving chips is electrically connected to a corresponding data line among the data lines DL1 to DLm.

Each of the pixels PX may include, for example, a light-emitting element and a circuit unit that controls an emission operation of the light-emitting element. For example, the light-emitting element may be an organic light-emitting diode.

Figure 3:
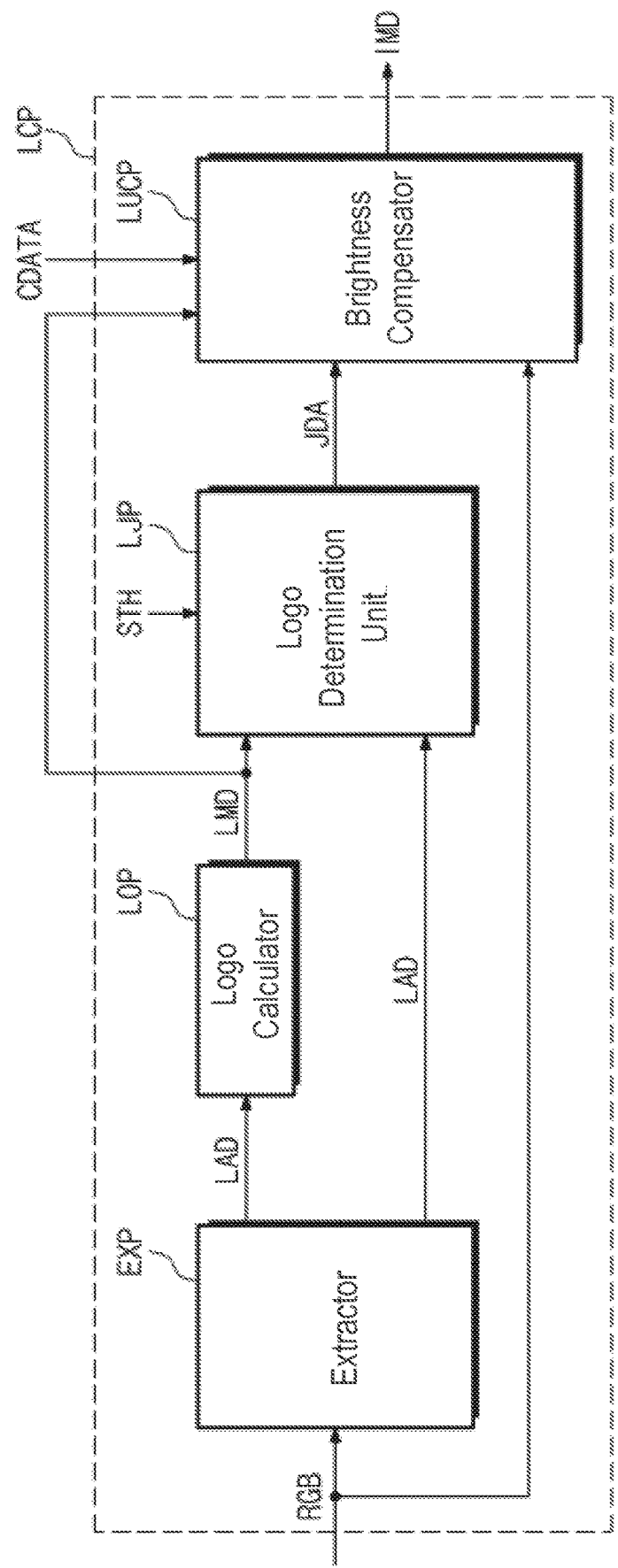
FIG. 3 is a block diagram showing a logo compensator according to an embodiment of the present disclosure.
Figure 4:
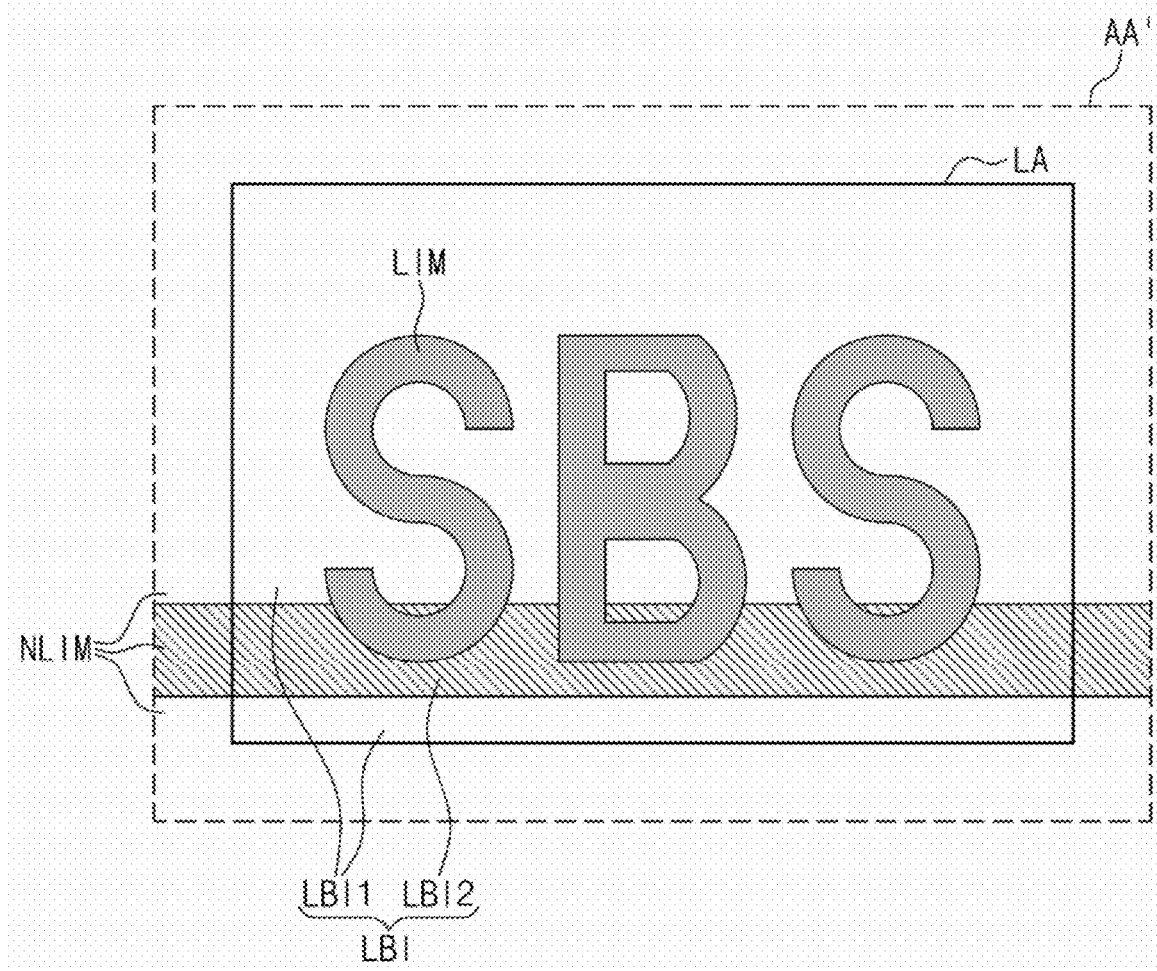
FIG. 4 is an enlarged plan view showing a portion of a display panel corresponding to an area AA' of FIG. 1.

FIG. 3 is a block diagram showing the logo compensator LCP according to an embodiment of the present disclosure, and FIG. 4 is an enlarged plan view showing a portion of the display panel corresponding to an area AA' of FIG. 1. FIGS. 5A and 5B are views showing an operation of a logo calculator LOP of FIG. 3.

Referring to FIGS. 3, 4, 5A, and 5B, the logo compensator LCP may include an extractor EXP, a logo calculator LOP, a logo determination unit LJP, and a brightness compensation block LUB.

The extractor EXP may extract logo area data LAD from the image signal RGB with respect to a logo area LA in which the logo image LIM displayed through the display panel DP (refer to FIG. 1) and a logo background image LBI around the logo image LIM are displayed. According to an embodiment, the extractor EXP may include an artificial intelligence program that performs machine learning to detect the logo area LA. For example, the extractor EXP may extract the logo area LA using the machine learning based on a convolutional neural network (CNN) model. Additionally, or alternatively, the extractor EXP may extract the logo area LA using an artificial intelligence program that performs deep learning.

For example, a supervised learning technique may provide training examples that correspond to logos, and examples that do not correspond to logos. The extractor EXP may encode features of the training images, and predict whether the training images correspond to logos. The predicted classification can be compared to the ground truth classification, and parameters of the extractor EXP may be updated based on the comparison.

In some examples, the extractor EXP extracts the logo area LA by analyzing the image IM displayed for over multiple image frames (e.g., for a predetermined amount of time). Additionally, or alternatively, the extractor EXP may extract the logo area LA by analyzing frames of the image IM, which are repeated at specific times.

FIG. 4 shows the logo area LA extracted by the extractor EXP. For example, the logo area LA includes the logo image LIM displayed as "SBS" and the logo background image LBI displayed as a background LBI1 around the "SBS" and a bar shape LBI2 at a lower portion of the "SBS". In this case, the background LBI1 around the "SBS" may have a large difference in grayscale when compared with the logo image LIM, and the bar shape LBI2 at the lower portion of the "SBS" may have substantially the same grayscale as that of the logo image LIM or may have a small difference in grayscale when compared with the logo image LIM.

The logo calculator LOP may receive the logo area data LAD from the extractor EXP. The logo calculator LOP may calculate logo map data LMD. The logo map data LMD may include first data corresponding to a first image IM1 recognized as the logo image LIM in the logo area LA and second data corresponding to a second image IM2 recognized as the logo background image LBI in the logo area LA based on the logo area data LAD.

The logo calculator LOP may segment the logo area LA into a first area AR1 corresponding to the first image IM1 recognized as the logo image LIM and a second area AR2 corresponding to the second image IM2 recognized as the logo background image LBI to generate a logo map LM and may calculate the logo map data LMD corresponding to the logo map LM. In this case, the logo calculator LOP may segment the logo area LA through binarization, and for example, the logo calculator LOP may segment the logo area LA using Otsu's method. The logo calculator LOP may generate a histogram with respect to the grayscale of the logo area data LAD and may set a threshold value based on the histogram to distinguish the logo image LIM from the logo background image LBI. In this case, the logo area LA may be segmented into the first area AR1 corresponding to the first image IM1 recognized as the logo image LIM and the second area AR2 corresponding to the second image IM2 recognized as the logo background image LBI with respect to the threshold value. Therefore, embodiments of the present disclosure may generate the logo map LM with the first image IM1 and the second image IM2. In this case, the first data corresponding to the first image IM1 may be determined as "1" in binary, and the second data corresponding to the second image IM2 may be determined as "0" in binary. For example, an area determined as "1" in binary may be referred to as the first area AR1, and an area determined as "0" in binary may be referred to as the second area AR2 as shown in FIGS. 5A and 5B.

Referring to FIGS. 5A and 5B, the logo map LM is shown. The logo map LM may be obtained by segmenting the logo area LA into the first area AR1 corresponding to the first image IM1 and the second area AR2 corresponding to the second image IM2 using the logo calculator LOP. In this case, the logo calculator LOP may recognize the "SBS" that is the logo image LIM in the logo area LA and the bar shape LBI2 at the lower portion of the "SBS", which is a portion of the logo background image LBI, as the logo image LIM corresponding to the first area AR1 and may recognize the other portion of the logo area LA except the first area AR1 as the logo background image LBI corresponding to the second area AR2. Therefore, the logo area LA may be segmented into the first area AR1 and the second area AR2.

For example, the logo calculator LOP may recognize a portion corresponding to the logo image LIM in the logo area LA as the logo image LIM and the portion corresponding to the logo image LIM may be segmented as the first area AR1. Additionally, or alternatively, the logo calculator LOP may recognize a portion of the logo background image LBI, which has the grayscale equal to or similar to that of the logo image LIM, as the logo image LIM, and the portion of the logo background image LBI may be segmented as the first area AR1. Further, the logo calculator LOP may receive the logo area data LAD. Additionally, the logo calculator LOP may segment an area wider than the logo area LA into the first area AR1 recognized as the logo image LIM and the second area AR2 recognized as the logo background image LBI to generate the logo map LM in addition to the logo area LA extracted by the extractor EXP. The logo calculator LOP may also calculate the logo map data LMD, including the first and second data corresponding to the logo map LM. In this case, the logo calculator LOP may obtain a position of the logo area LA using the logo area data LAD, may segment the image signal RGB with respect to the area including the logo area LA to generate the logo map LM of the area wider than the logo area LA, and may calculate the logo map data LMD corresponding to the logo map LM. Even in a case where the entire logo image LIM is not included in the logo area LA, the segmentation may be performed on the first area AR1 recognized as the logo image LIM.

The logo determination unit LJP may receive the logo area data LAD from the extractor EXP and may receive the logo map data LMD from the logo calculator LOP. Additionally, or alternatively, the logo determination unit LJP may receive a predetermined threshold value STH. The logo determination unit LJP may set a portion of the logo area LA as a boundary area and may determine whether the first area AR1 corresponding to the first image IM1 in the logo area LA overlaps the boundary area to output determination data JDA. Functions, configurations, and operations of the logo determination unit LJP will be described in detail with reference to FIGS. 6, 7A, 7B.

The brightness compensation block LUB may compensate for the brightness of the logo area LA according to the determination data JDA. The brightness compensation block LUB may receive the image signal RGB from the external source, may receive the determination data JDA from the logo determination unit LJP, and may receive the logo map data LMD from the logo calculator LOP. Additionally, or alternatively, the brightness compensation block LUB may receive compensation data CDATA from the timing controller TCP.

The timing controller TCP may generate the compensation data CDATA through the histogram analysis with respect to the grayscale of the logo area data LAD to compensate for the brightness of the first area AR1 corresponding to the first image IM1 in the logo area LA to a predetermined target brightness. In this case, the compensation data CDATA may be determined based on the result of analysis on the image IM displayed for the predetermined time. The brightness compensation block LUB may compensate for the brightness of the logo area LA based on the logo map data LMD and the compensation data CDATA. The brightness compensation block LUB may output the image data IMD including the first data in which the brightness of the first area AR1 in the logo area LA is compensated to the predetermined target brightness.

Figure 6:
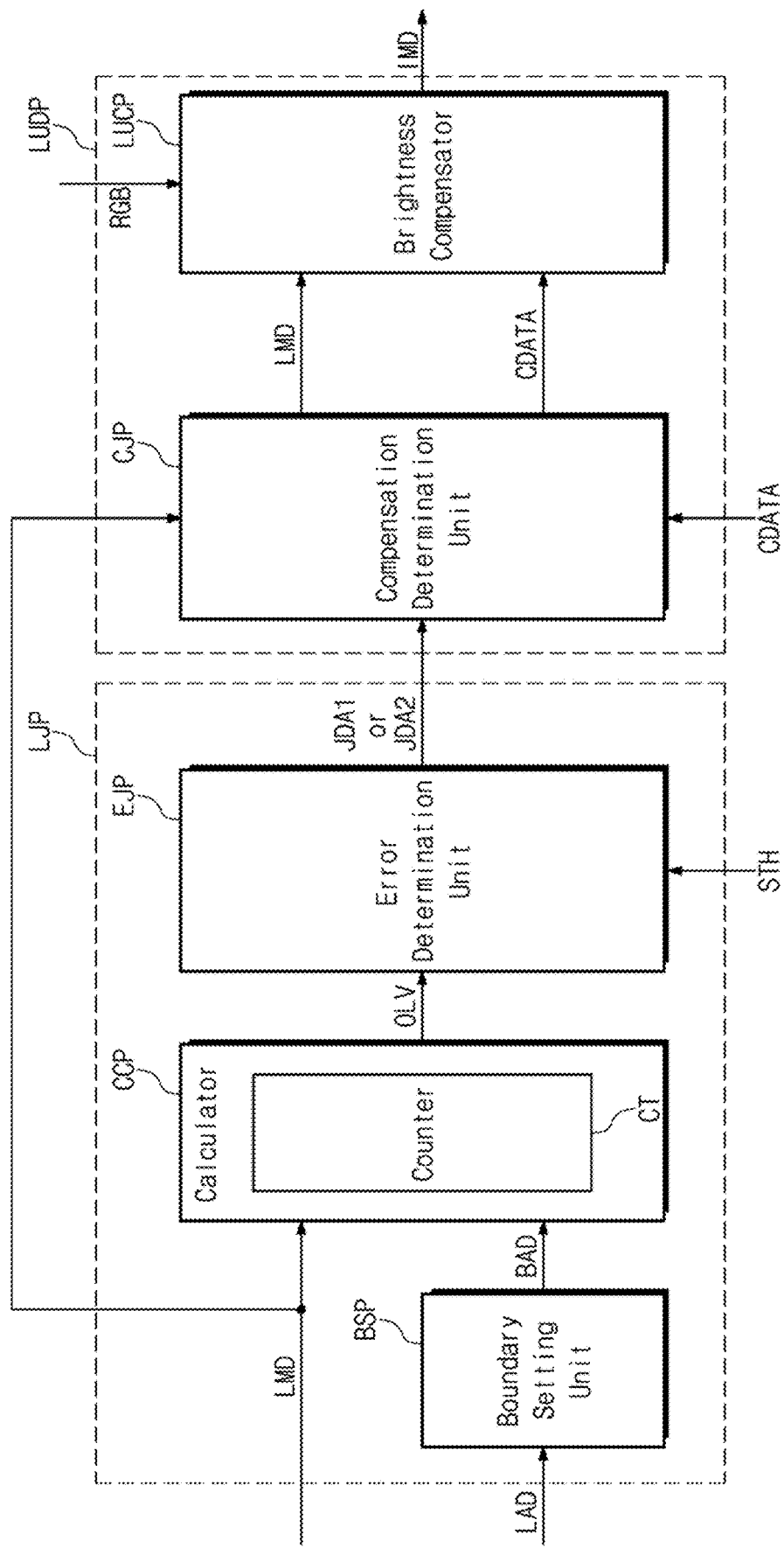
FIG. 6 is a block diagram showing a logo determination unit and a brightness compensation block of FIG. 3.

FIG. 6 is block diagram showing the logo determination unit LJP and the brightness compensation block LUB of FIG. 3, and FIGS. 7A and 7B are views showing an operation of a boundary setting unit BSP and a counter CT of FIG. 6.

Referring to FIGS. 6, 7A, and 7B, the logo determination unit LJP may include the boundary setting unit BSP, a calculator CCP, and an error determination unit EJP.

The boundary setting unit BSP may receive the logo area data LAD from the extractor EXP. The boundary setting unit BSP may set a portion of the logo area LA as a boundary area and may output boundary area data BAD containing information with respect to the set boundary area. The boundary area may be defined in the logo area LA and may be adjacent to an edge of the logo area LA. In detail, when the logo area has a quadrangular shape defined by four sides, the boundary area may be adjacent to each of the four sides. In particular, the boundary area may be defined by extending inward from each side, and the boundary area adjacent to each of the four sides of the logo area may have a width that is substantially the same as a sum of widths of n pixels. In this case, "n" is two or three. The boundary area may not to overlap the area in which the logo image LIM is displayed in the logo area LA. However, the present disclosure is not limited thereto. The boundary area may be set in a variety of forms in the logo area LA. The boundary area may be used as a reference to calculate an overlap value OLV that indicates a degree of overlap between the boundary area BA and the first area AR1, which are described later.

The calculator CCP may receive the boundary area data BAD from the boundary setting unit BSP and may receive the logo map data LMD from the logo calculator LOP. The calculator CCP may calculate the overlap value OLV that indicates the degree of overlap between the boundary area and the first area AR1 of the logo area LA. The calculator CCP may include a counter CT that counts the number of the pixels PX corresponding to the area in which the boundary area overlaps the first area AR1. The calculator CCP may output the value counted by the counter CT as the overlap value OLV.

Referring to FIG. 7A, for example, a first boundary area BA1 that includes areas respectively adjacent to the four sides of the logo area LA may be set by the boundary setting unit BSP. Among the areas of the first boundary area BA1, areas adjacent to sides of the logo area LA, which are substantially parallel to each other in the first direction DR1, may have a first width W1, and areas adjacent to sides of the logo area LA, which are substantially parallel to each other in the second direction DR2, may have a second width W2. Predetermined areas in which the first boundary area BA1 overlaps the first area AR1 displaying the first image IM1 may be referred to as a "first overlap area OLA1". The calculator CCP may output the number of the pixels corresponding to the first overlap area OLA1, which is counted by the counter CT, as the overlap value OLV.

Referring to FIG. 7B, for example, a second boundary area BA2 includes areas respectively adjacent to the four sides of the logo area LA and may be set by the boundary setting unit BSP. Among the areas of the second boundary area BA2, areas adjacent to sides of the logo area LA, which are substantially parallel to each other in the first direction DR1, may have a third width W3, and areas adjacent to sides of the logo area LA, which are substantially parallel to each other in the second direction DR2, may have a fourth width W4. Predetermined areas in which the second boundary area BA2 overlaps the first area AR1 displaying the first image IM1 may be referred to as a "second overlap area OLA2". In this case, the calculator CCP may output the number of the pixels corresponding to the second overlap area OLA2, which is counted by the counter CT, as the overlap value OLV.

The overlap value OLV may vary depending on how the boundary setting unit BSP sets the boundary area. For example, when the boundary setting unit BSP sets the boundary area as the first boundary area BA1 shown in FIG. 7A, the overlap value OLV may be reduced when the boundary area is set as the second boundary area BA2 shown in FIG. 7B. Accordingly, a reference to determine whether an error occurs in the calculation of the logo map data LMD of the logo calculator LOP may be changed by the boundary setting unit BSP that changes the setting of the boundary area without changing the predetermined threshold value STH described below.

The error determination unit EJP may receive the overlap value OLV from the calculator CCP. Additionally, or alternatively, the error determination unit EJP may receive the predetermined threshold value STH from the outside. The threshold value STH may be set based on the number of pixels as a setting unit. The error determination unit EJP may compare the overlap value OLV with the predetermined threshold value STH. When the overlap value OLV is greater than the threshold value STH, the error determination unit EJP may generate first determination data JDA1. When the overlap value OLV is equal to or smaller than the predetermined threshold value STH, the error determination unit EJP may generate second determination data JDA2. The threshold value STH may serve as the reference to determine whether the error occurs in the calculation of the logo map data LMD of the logo calculator LOP. In the case where the size of the overlap area is constant, it may be determined that there is no error in the calculation of the logo map data LMD when the overlap value OLV is equal to or smaller than the threshold value STH. An error in the calculation of the logo map data LMD may be determined when the overlap value OLV is greater than the threshold value STH.

The brightness compensation block LUB may include a compensation determination unit CJP and a brightness compensator LUCP.

The compensation determination unit CJP may receive the determination data JDA (refer to FIG. 3) from the error determination unit EJP and may receive the logo map data LMD from the logo calculator LOP (refer to FIG. 3). Additionally, or alternatively, the compensation determination unit CJP may receive the compensation data CDATA from the timing controller TCP. The compensation determination unit CJP may receive the determination data JDA from the error determination unit EJP and may determine whether to compensate for the brightness of the logo area LA. When the compensation determination unit CJP receives the second determination data JDA2 from the error determination unit EJP, the compensation determination unit CJP may apply the logo map data LMD and the compensation data CDATA to the brightness compensator LUCP. When the compensation determination unit CJP receives the first determination data JDA1 from the error determination unit EJP, the compensation determination unit CJP may not apply at least one of the logo map data LMD and the compensation data CDATA to the brightness compensator LUCP.

The brightness compensator LUCP may receive the image signal RGB from the external source. Additionally, or alternatively, when the first compensation data JDA1 are output from the error determination unit EJP, the brightness compensator LUCP may receive the logo map data LMD and the compensation data CDATA from the compensation determination unit CJP. When the second compensation data JDA2 are output from the error determination unit EJP, the brightness compensator LUCP may not receive at least one of the logo map data LMD and the compensation data CDATA. When the brightness compensator LUCP receives the logo map data LMD and the compensation data CDATA, the brightness compensator LUCP may compensate for the brightness of the first area AR1 of the logo area LA based on the logo map data LMD and the compensation data CDATA. The brightness compensator LUCP may convert the image signal RGB to output the image data IMD with the first data in which the brightness of the first area AR1 of the logo area LA is compensated to the predetermined target brightness.

When the brightness compensator LUCP does not receive at least one of the logo map data LMD and the compensation data CDATA, the brightness compensator LUCP may not compensate for the brightness of the first data. When the brightness compensator LUCP does not receive the logo map data LMD, the brightness compensator LUCP may not compensate for the brightness of the first data since there is no information on the first data to be compensated for brightness. When the brightness compensator LUCP does not receive the compensation data CDATA there is no information on the predetermined target brightness indicating a degree of brightness compensation for the first data. Therefore, the brightness compensator LUCP may not compensate for the brightness of the first data. In this case, the brightness compensator LUCP may convert the image signals RGB to generate the image data IMD where the brightness of the first area AR1 is not compensated.

Figure 8:
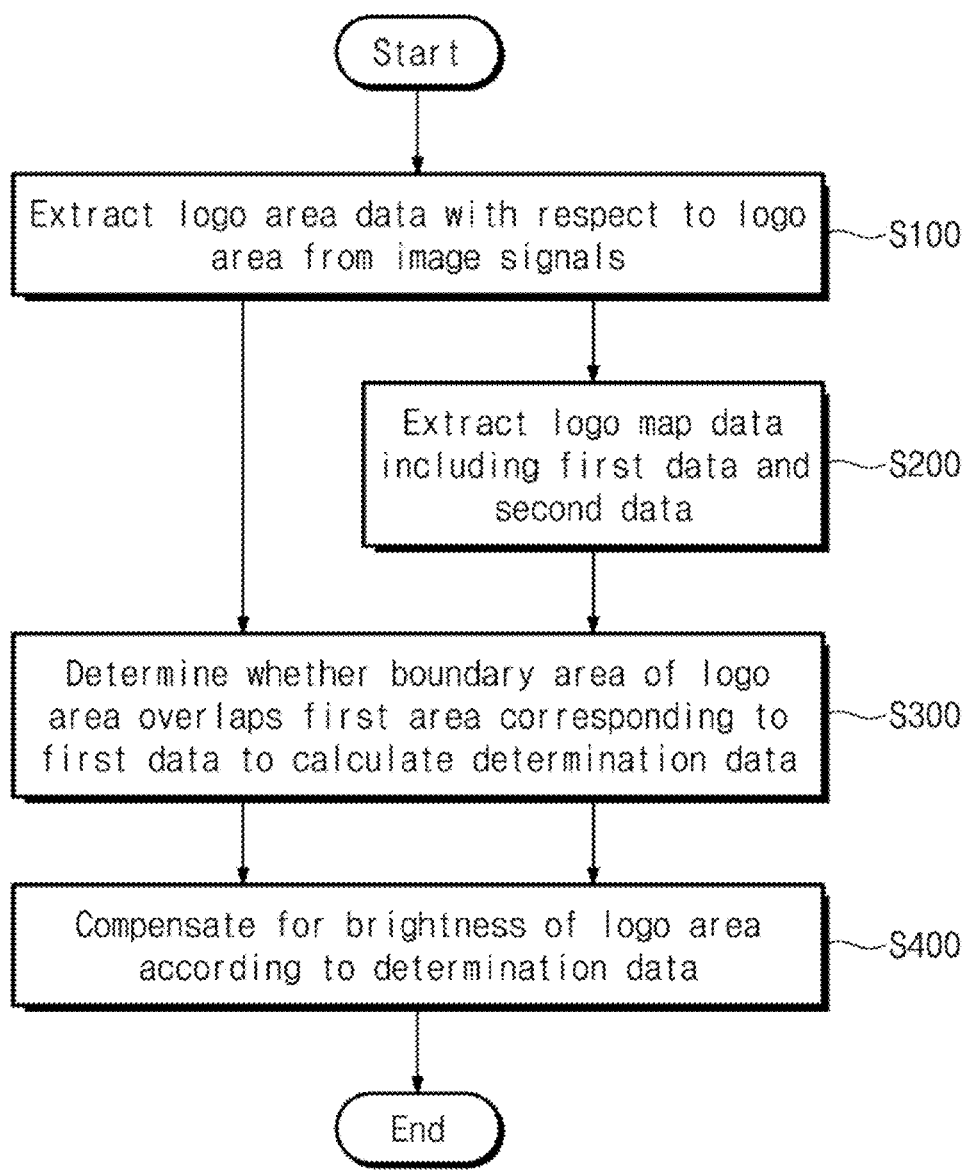
FIG. 8 is a flowchart showing a method of compensating for a brightness of a logo area according to an embodiment of the present disclosure.
Figure 9:
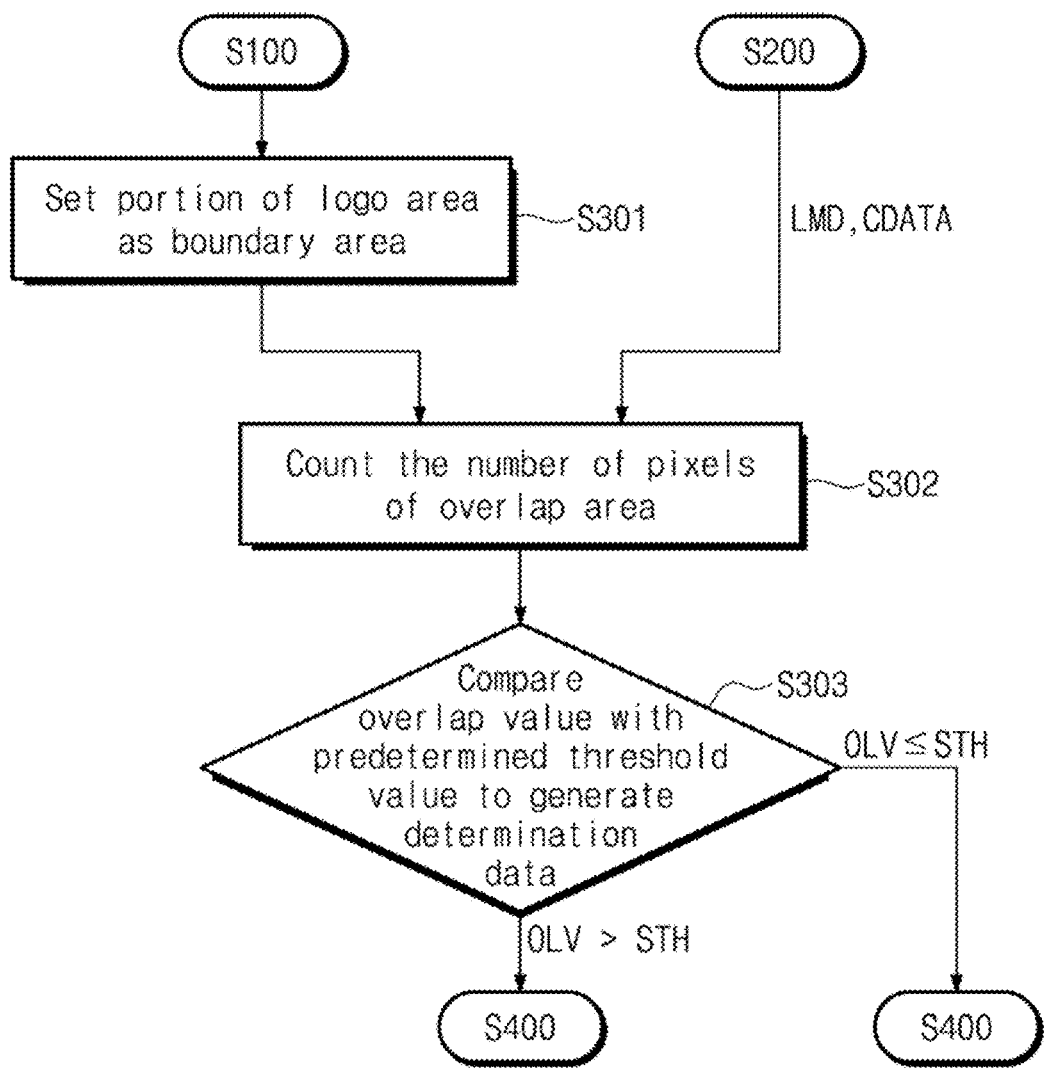
FIG. 9 is a flowchart showing a method of outputting determination data with respect to an overlap state.

FIGS. 8 and 9 are flowcharts showing a method of driving the logo compensator according to an embodiment of the present disclosure.

Hereinafter, an operation of compensating for the brightness of the logo area using the logo compensator LCP (refer to FIG. 3) will be described with reference to FIGS. 8 and 9.

Referring to FIGS. 3 and 8, the logo compensator LCP extracts the logo area data LAD with respect to the logo area LA from the image signal RGB (S100). The logo compensator LCP calculates the logo map data LMD with the first data and the second data based on the logo area data LAD (S200). Then, the logo compensator LCP sets the boundary area in the logo area LA based on the logo area data LAD and determines whether the boundary area overlaps the first area AR1 corresponding to the first data based on the logo map data LMD to calculate the determination data JDA (S300). The logo compensator LCP compensates for the brightness of the logo area LA according to the determination data JDA (S400).

Referring to FIGS. 3 and 9, the logo compensator LCP sets the portion of the logo area LA as the boundary area based on the logo area data LAD (S301). The logo compensator LCP calculates the first area AR1 corresponding to the first data based on the logo map data LAD and counts the number of the pixels corresponding to the area in which the boundary area overlaps the first area AR1 to calculate the overlap value OLV (S302). Then, the logo compensator LCP compares the overlap value OLV with the predetermined threshold value STH to generate the determination data JDA. When the overlap value OLV is greater than the threshold value STH, the first determination data JDA1 are generated. Additionally, or alternatively, when the overlap value OLV is equal to or smaller than the threshold value STH, the second determination data JDA2 are generated.

Although the embodiments of the present disclosure have been described, it is understood that the present disclosure should not be limited to these embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present inventive concept shall be determined according to the attached claims.

What is claimed is:

1. A display device comprising:
   a display panel comprising a display area configured to display an image comprising a logo image and a non-logo image; and
   a driver configured to receive an image signal and apply a data signal to the display panel, the driver comprising a logo compensator configured to generate logo map data for a logo area and to compensate for a brightness of the logo area based on the logo map data, the logo compensator comprising:
      an extractor configured to extract logo area data with respect to the logo area from the image signal;
      a logo calculator configured to calculate the logo map data comprising first data corresponding to a first image recognized as the logo image and second data corresponding to a second image recognized as a logo background image around the logo image;
      a logo determination unit configured to set a portion of the logo area as a boundary area, to determine whether a first area corresponding to the first image in the logo area overlaps the boundary area and to output determination data; and
      a brightness compensation block configured to compensate for the brightness of the logo area based on the determination data,
   wherein the logo determination unit comprises:
      a boundary setting unit configured to set the boundary area;
      a calculator configured to calculate an overlap value based on a number of pixels corresponding to an area in which the boundary area of the logo area overlaps the first area of the logo area; and
      an error determination unit configured to compare the overlap value with a predetermined threshold value, generate first determination data as the determination data when the overlap value is greater than the threshold value, and generate second determination data as the determination data when the overlap value is equal to or smaller than the threshold value.

2. The display device of claim 1, wherein the display panel comprises a plurality of pixels, the calculator comprises a counter counting the number of pixels corresponding to the area in which the boundary area overlaps the first area, and the calculator outputs the counted value as the overlap value.

3. The display device of claim 2, wherein the boundary area is set around an edge in the logo area.

4. The display device of claim 3, wherein the boundary area does not overlap the area through which the logo image is displayed in the logo area.

5. The display device of claim 1, wherein the brightness compensation block further comprises a compensation determination unit configured to receive the determination data from the error determination unit and determine whether to compensate for the brightness of the logo area.

6. The display device of claim 5, wherein the brightness compensation block further comprises a brightness compensator configured to receive the image signal and compensate for the image signal based on the logo map data and compensation data used to compensate for a brightness corresponding to the first area of the logo area to a predetermined target brightness.

7. The display device of claim 6, wherein the compensation determination unit is configured to apply the logo map data and the compensation data to the brightness compensator when receiving the second determination data.

8. The display device of claim 6, wherein the compensation determination unit does not apply at least one of the logo map data and the compensation data to the brightness compensator when receiving the first determination data.

9. The display device of claim 1, wherein the driver comprises:
   a timing controller configured to receive the image signal and a control signal from the external and generating image data, a source control signal and a gate control signal;
   a source driver configured to receive the image data and the source control signal from the timing controller; and
   a gate driver configured to receive the gate control signal from the timing controller, wherein the timing controller comprises the logo compensator.

10. The display device of claim 1, wherein the logo calculator is configured to calculate the logo map data comprising the first and second data with respect to an area wider than the logo area based on the logo area data.

11. A method of driving a display device comprising a display panel comprising a display area through which an image comprising a logo image and a non-logo image is displayed and a driver receiving an image signal from an outside and applying a data signal to the display panel, the method comprising:
   generating logo map data with respect to a logo area through which the logo image is displayed in the display area; and
   compensating for a brightness of the logo area using the logo map data, wherein the compensating for the brightness of the logo area comprises:
      extracting logo area data with respect to the logo area from the image signal;
      calculating the logo map data comprising first data corresponding to a first image recognized as the logo image and second data corresponding to a second image recognized as a logo background image around the logo image based on the logo area data;
      setting a portion of the logo area as a boundary area, determining whether a first area corresponding to the first image in the logo area overlaps the boundary area, and to output determination data; and
      compensating for the brightness of the logo area according to the determination data,
   wherein the outputting of the determination data comprises:
      setting the boundary area;
      calculating an overlap value based on a number of pixels corresponding to an area in which the boundary area of the logo area overlaps the first area of the logo area; and comparing the overlap value with a predetermined threshold value to generate first determination data when the overlap value is greater than the threshold value and to generate second determination data when the overlap value is equal to or smaller than the threshold value.

12. The method of claim 11, wherein the display panel comprises a plurality of pixels, and the calculating of the overlap value comprises:

counting the number of boundary pixels corresponding to the boundary area and overlapping first pixels corresponding to the first area; and outputting the counted value as the overlap value.

13. The method of claim 12, wherein the boundary area is set around an edge in the logo area.

14. The method of claim 13, wherein the boundary area does not overlap an area through which the logo image is displayed in the logo area.

15. The method of claim 11, wherein the compensating for the brightness of the logo area further comprises determining whether to compensate for the brightness of the logo area based on the determination data.

16. The method of claim 15, wherein the compensating for the brightness of the logo area further comprises:

receiving the image signal; and compensating for the image signal based on the logo map data and compensation data used to compensate for a brightness corresponding to the first area of the logo area to a predetermined target brightness.

17. The method of claim 16, wherein, when the second determination data are received in the determining whether to compensate for the brightness of the logo area, the logo map data and the compensation data are outputted.

18. The method of claim 16, wherein, when the first determination data are received in the determining whether to compensate for the brightness of the logo area, at least one of the logo map data and the compensation data is not outputted.

* * * * *